United States Patent
Fortin et al.

(10) Patent No.: US 7,414,568 B2
(45) Date of Patent: Aug. 19, 2008

(54) LOW IRRADIANCE SENSOR WITH ITERATIVE ANGULAR RESOLUTION

(75) Inventors: Jean Fortin, Ste-Foy (CA); Jacques Dubois, Neufchatel (CA)

(73) Assignee: Her Majesty the Queen in right of Canada, as represented by the Minister of National Defence of Her Majesty's Canadian Government, Ottawa, Ontario (CA)

( * ) Notice: Subject to any disclaimer, the term of this patent is extended or adjusted under 35 U.S.C. 154(b) by 1415 days.

(21) Appl. No.: 10/395,083

(22) Filed: Mar. 25, 2003

(65) Prior Publication Data

US 2006/0108499 A1    May 25, 2006

(51) Int. Cl.
*H04K 3/00* (2006.01)
(52) U.S. Cl. .................................... 342/45; 398/39
(58) Field of Classification Search ............ 342/45, 342/54; 250/214 VT; 359/154; 398/39
See application file for complete search history.

(56) References Cited

U.S. PATENT DOCUMENTS

| | | |
|---|---|---|
| 4,630,049 A | 12/1986 | Callahan, Jr. |
| 5,142,288 A | 8/1992 | Cleveland |
| 5,280,167 A * | 1/1994 | Dubois ................. 250/214 VT |
| 6,433,330 B1 * | 8/2002 | Dubois ........................ 250/226 |
| 6,770,865 B2 * | 8/2004 | Wootton et al. ............. 250/226 |

FOREIGN PATENT DOCUMENTS

EP    001160549 A2 * 12/2001

\* cited by examiner

*Primary Examiner*—Mark Hellner
(74) *Attorney, Agent, or Firm*—Stites & Harbison PLLC; Ross F. Hunt, Jr.

(57) ABSTRACT

A laser warning receiver (LWR) to detect a very low power laser beam for a laser beam rider and provide a high angular resolution in determining the angle-of-arrival of that beam. An aperture having a fixed field-of-view (FOV) is located in a detection channel followed by a narrow-band filter and a detector whose output is applied to a pulse analyzer circuit. A localization channel with the same FOV has a similar narrow-band filter and a lens to focus light from that FOV onto a detector through a N×M element LCD matrix, an output of that detector being applied to the pulse analyzer circuit whose output is applied to a LCD pattern selector connected to the matrix which controls elements in the matrix to provide a transparent window of variable size and position. The size and position of that window allows a laser beam to reach the detector, the window being iterative reduced in size when a beam is detected to provide the location of its source.

5 Claims, 2 Drawing Sheets

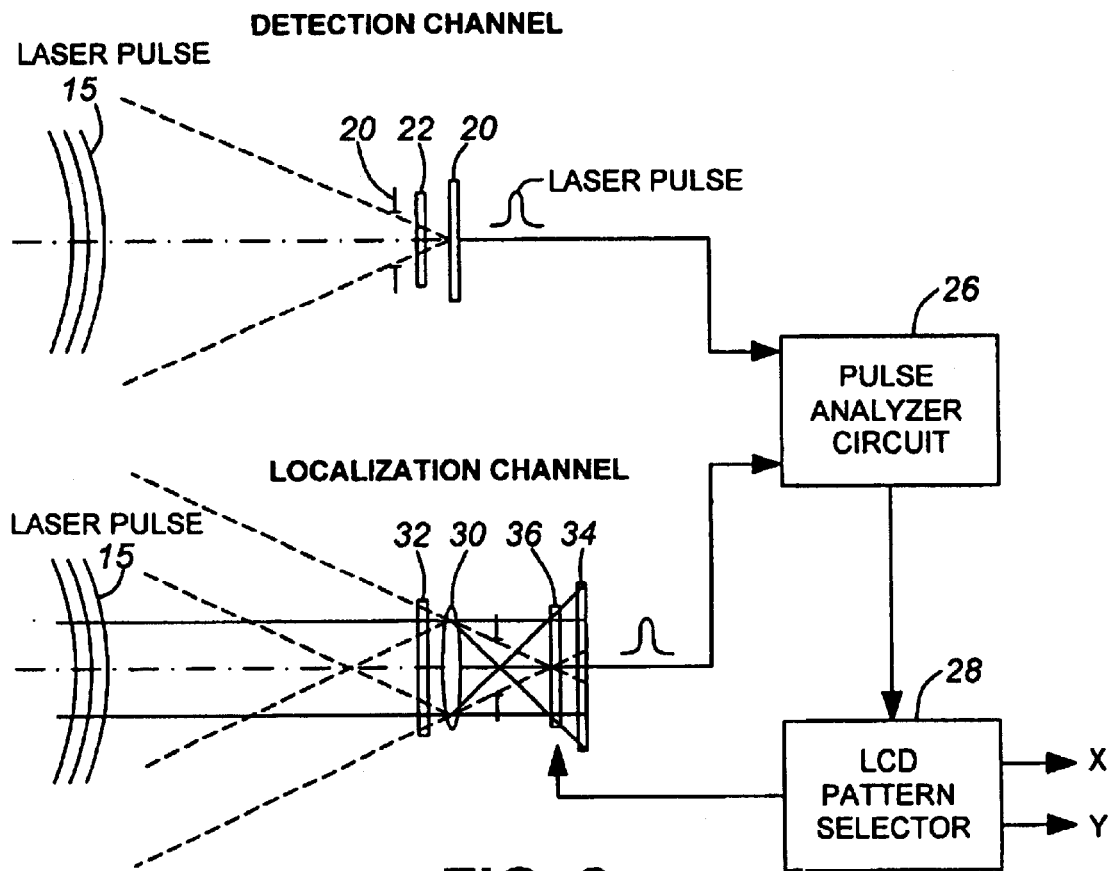
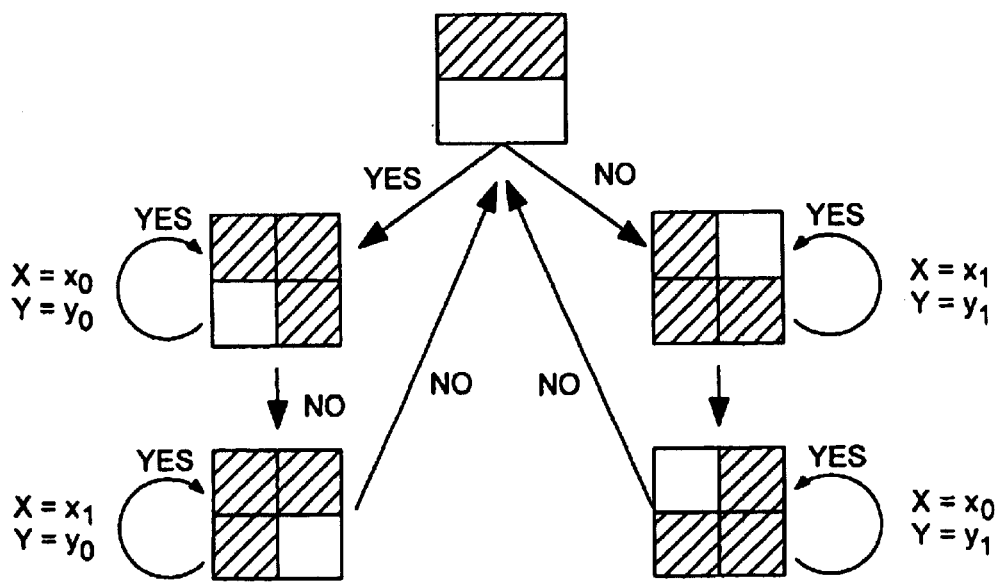
FIG. 3

LOW IRRADIANCE SENSOR WITH ITERATIVE ANGULAR RESOLUTION

FIELD OF THE INVENTION

The present invention relates to a laser warning receiver (LWR) for protecting military platforms against laser guided weapons by detecting, identifying and locating the laser sources associated with those weapons and in particular to receivers which can detect radiation from very low power laser sources, such as those for a laser beam rider (LBR), with a high angular resolution in the determination of the angle-of-arrival of the laser radiation.

BACKGROUND OF THE INVENTION

Many research laboratories and manufacturers around the world are presently involved in the development of laser warning receivers (LWR) for the purpose of protecting military platforms against laser guided weapons by detecting, identifying and locating the laser sources associated with those weapons. A high angular resolution in the determination of the angle-of-arrival of the laser radiation from laser guided weapons is essential in order to effectively optimize counter measures deployed against those weapons. That type of resolution is, however, only possible with the receivers available at present for powerful laser sources such as laser weapons (LW), laser range finders (LRF) and laser target designators (LTD) which generate relatively high levels of power density on a sensing device. The detection of very low level power (VLPL) sources, such as associated with a laser beam rider (LBR), is still generally characterized by a very low resolution with few of the existing LWR's being capable of detecting radiation from a LBR with an angular resolution better than a quadrant. LBR detection up to now has been usually carried out by dedicated wide field-of-view (FOV) high-gain modules, one per quadrant, which simply detect a LBR source without any high degree of resolution. One problem with VLPL detection is high irradiance level created by the sun in normal daylight conditions as compared to the irradiance of the VLPL source so that the beam from the VLPL source is deeply buried in background radiation.

Various techniques for the detection of laser sources are known that use shadow masks, fibre optic bundles, lenses, video imagery, coherence discriminators or holography to achieve detection. Most of these techniques do not provide a combination of a low detection threshold, high angular resolution, wide FOV and wide waveband coverage as required for effective detection and localization of LBR weapons.

The most straightforward method for detecting laser sources combine a photodetector and a narrow-band filter. The filter reduces the level of background radiation and achieves the low detection threshold required. The bandwidth of the filter is fixed and chosen to match the VLPL source wavelength. A problem associated with this method is the lack of angular resolution which is, typically, limited to a quadrant. These types of methods were, however, successfully combined with a gated video camera to produce a high sensitivity system having a high angular resolution as described by Jacques Dubois in U.S. Pat. No. 5,280,167 which issued on 18 Jan. 1994. The main drawbacks of the system described in U.S. Pat. No. 5,280,167 is the relative complexity and, as a result, the high cost associated with that system.

SUMMARY OF THE INVENTION

It is an object of the present invention to provide a less complex laser warning receiver (LWR) with the ability to detect very low power level laser sources such as radiation from a source for a laser beam rider (LBL) and to provide a high angular resolution in the determination of the angle-of-arrival of radiation from that source.

A laser warning receiver according to one embodiment of the present invention comprises a detection channel with an aperture providing a fixed field-of-view and an optical filter arrangement before a photodetector to detect any incoming signals consisting of a laser beam emitted by a source, the output from the detector being connected to a pulse analyzer circuit for analyzing detected signals, a further localization channel for detected signals comprises an optical filter similar to the one in the detector channel, a lens having a similar field-of-view (FOV) as in the detection channel which focuses that FOV onto a N×M element liquid crystal display (LCD) matrix and a second detector wherein each element in he LCD matrix is controlled by a pattern selector connected to the pulse analyzer circuit, the selector being connected to the matrix, an output from the second detector in the localization channel being connected to the pulse analyzer circuit, transparent elements in the matrix allowing a laser beam to be transmitted to the second detector where the FOV in the localization channel is defined by the size of a transparent area in the LCD and a variable direction of regard (DOR) is defined by that transparent area's position, the size of the window being iterative reduced by the pattern selector when a laser beam from a source is detected.

BRIEF DESCRIPTION OF THE DRAWINGS

The invention will now be described in more detail with reference to the accompanying drawings, in which:

FIG. 2 is a block diagram of a LWR according to the present invention, and

FIG. 3 illustrates one LCD matrix search sequence for a 2×2 element liquid crystal matrix (LCD).

DETAILED DESCRIPTION OF THE PREFERRED EMBODIMENTS

Figure 1:
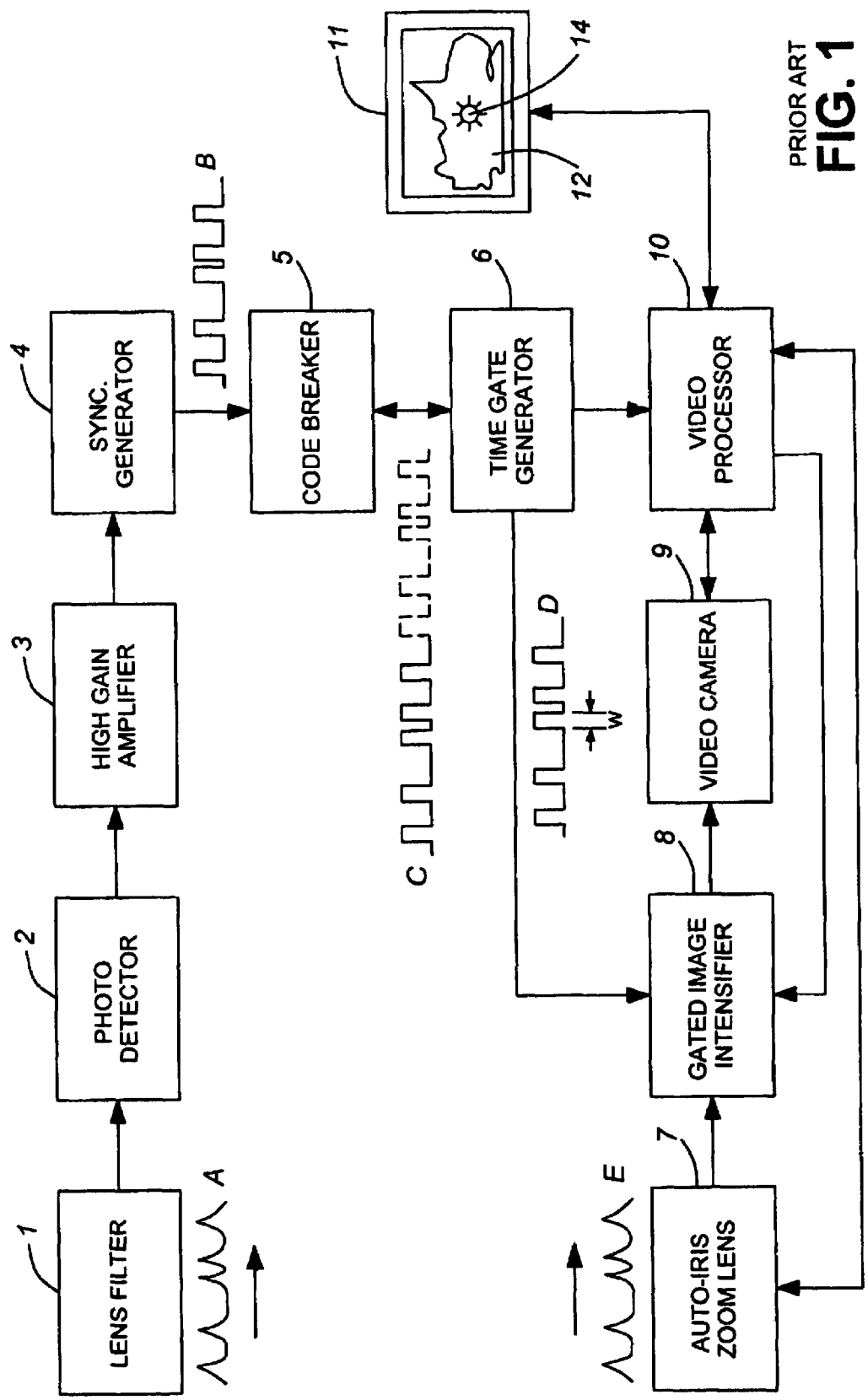
FIG. 1 is a block diagram of a known laser warning receiver (LWR)

The known very high resolution laser beam detector for a laser beam rider (LBR) described by Jacques Dubois in U.S. Pat. No. 5,280,167 and illustrated in the FIG. 1 includes an optical filter in a lens filter arrangement 1 which features a fixed or variable spectral bandwidth arranged before either a large area photodetector 2 or a smaller photodetector coupled to a very short focal length lens. In this particular embodiment of a LBR detector, four detector units may be provided with each having a 90° coverage in azimuth and elevation. A laser pulse train emitted by a source for a LBR, as illustrated at A, is filtered by the optical filter and detected by the photodetector 2 whose output is applied to a high gain amplifier 3.

The high gain amplifier 3 amplifies the received laser pulse train A and applies that amplified signal to a synchronization pulse generator 4 which generates a series of digital synchronization pulses B that corresponds to peaks in pulses from the received signal A. The series of pulses B from synchronization generator 4 are then applied to a code breaker 5 where the code is analyzed and deciphered in order to identify the source of the received signal A and to anticipate the time of arrival of further pulses in order to verify the perfect synchronization of the digital pulse code C with the received signal A. Once verified, the synchronization generator 4 also restores any pulses from the received signal A which are missing or are so weak as to go undetected by photodetector 2.

The verified digital pulse code C is applied to a time gate generator 6 which generates a series of pulses D synchronized with ones emitted by a laser source and detected by the photodetector 2. However, although pulses are synchronized with those at B, the pulses in pulse train D have widths W that are continuously variable, those widths being controlled by a video processor 10 which is connected to the time gate generator 6.

The pulse train D, from the time gate generator 6, is applied to a gated image intensifier 8 coupled to a video camera 9, which obtains an image from the gated image intensifier 8 and applies that image to the video processor 10. The pulse train D controls the high voltage of the image intensifier 8 and the intensifier gating so obtained makes possible the synchronization of the image intensifier sampling, which are recorded by video camera 9, with the emissions from the source so that the latter is more strongly differentiated from the background. The widths W of the pulses in pulse train D are continuously variable under control of video processor 10 which can adjust those widths in order to obtain an adequate image of the source with respect to the background. The video processor 10 controls the adjustments of video camera 9 and processes the video image from the camera 9 before applying that processed signal to a video monitor 11 where the laser source can be observed as an image 14 against a background 12.

The video processor 10 is also connected to and controls an auto-iris zoom lens 7 for the gated image intensifier 8 whose focal length is initially in the wide angle position. The lens 7 in this wide angle position, if it is directed towards the source, will receive the same type of signal E from the source as that detected by photodetector 2. However, once the lens 7 is directed towards the signal source, its focal length can be increased by the video processor 10 to pinpoint the laser source into a narrow field-of-view (FOV). This will result in a system that will provide a high angular resolution in determining the angle-of-arrival (AOA) of the laser radiation emitted from a very low power laser (VLPL) source such as associated with a LBR. Once this high angular resolution is obtained, countermeasures can be deployed in a timely manner to counteract any threat from the signal source.

In operation, a laser pulse train A emitted by a laser source would be first detected by a large area photodetector system through a lens/filter arrangement 1 and then amplified by a high gain amplifier 3 which forms a detector/amplifier unit. Four detector/amplifier units may be used with each unit providing a 90° coverage in azimuth and elevation. An amplified signal of a detected laser pulse train A is then applied to a synchronization generator 4 which generates a digital pulse train B having a code corresponding to and synchronized with that emitted from the laser source and detected by photodetector 2. That digital pulse train B is applied to a code breaker 5 where the code is analyzed and deciphered so that the time of arrival of the next peaks in the pulse train A can be anticipated. This generated code can then be verified by the perfect synchronization of the anticipated code pulses with those actually received. Once this code is verified, the code C from code breaker 5 is applied to a time gate generator 6 which generates a similar train of pulses D, but ones whose widths can be varied, and these are applied to the gated image intensifier 8. The gated image intensifier 8 is provided with an auto-iris zoom lens 7 which initially is in a wide angle position to provide a single wide FOV (>45°) system. This system is rotatable so that it can be brought into a position covering an angular sector where a laser pulse train A from a laser source is detected by one of the four detector/amplifier units. That rotatable system can then receive a signal E, which is the same as laser pulse train A, from the laser source.

The video camera 9 is then able to obtain a video image of the source emitting the laser pulse train A from the gated image intensifier once its auto-iris focus lens is directed to an angular sector containing the emitting source. The video camera supplies the video image signal to a video processor 10 which can process and display the image 14 of the source on a monitor 11. The video processor 10 controls, through its interconnections, the adjustments of the video camera 9 and the gain of the image intensifier 8. The video processor 10 is also connected to time gate generator 6 and controls the width of the pulses in pulse train D from the time gate generator 6. Those variable width pulses, under control of processor 10, are applied to the gated image intensifier 8 to control the high voltage of the image intensifier. The gating of the image intensifier, thus obtained, makes possible the synchronization of the image intensifier sampling, recorded by the video camera, with the peaks of the emitted pulse train from the source so that an image 14 of the source can be more easily differentiated from the background 12 shown on the monitor 11. The width of the gated pulses can be varied by the video processor in order to optimize the, or at least obtain an adequate, image 14 of the source which can be shown on the monitor 11.

The video processor can, by controlling the auto-iris function of the zoom lens 7, increase the focal length of the zoom lens to pinpoint the source into a narrow FOV and to keep the image intensifier directed towards the source once the zoom lens 7, in its initial wide angle position, image intensifier and video camera are directed towards the source. This narrow FOV pinpointing of the source provides a high angular resolution in the determination of the angle-of-arrival of the laser radiation from a laser source associated with a LBR. At this point, countermeasures can be deployed against the source in order to counteract its navigation system.

The overall dynamic range of this type of system can reach 12 order of magnitude by using controlling elements, automatic intensifier gain adjustment, a zoom lens auto-iris function and continuously variable intensifier gating under control of the video processor. The operation of this type of laser warning receiver will, as a result, be possible from bright sunlight to moonless nights. Either a GEN II (0.4 μm to 0.9 μm) or GEN III (0.57 μm to 0.9 μm) image intensifier can be used depending on the sensitivity and wavelength required. An angular resolution down to a fraction of a mrad possible with this type of laser warning receivers. This type of LBR is, however, relatively complex and expensive to manufacture.

A Low Irradiance Sensor with Iterative Angular Resolution (LISIAR) detector according to the present invention is illustrated in FIG. 2 and it is designed for the detection and localization of VLPL sources in bright sunlight. The problem with VLPL detection is due to the relatively high irradiance level created by the sun in normal daylight conditions as compared to the irradiance of the VLPL laser source itself. Generally, the signal from a VLPL laser source is deeply buried in background radiation and ingenious techniques must be used to achieve detection of that signal. The LISIAR according to the present invention provides a low-cost means to simultaneously obtain a very low detection threshold suitable for VLPL detection, a wide field-of-view (FOV) and a high angular resolution to localize the originating direction of the source of the VLPL beam.

The LISIAR according to one embodiment of the present invention and illustrated in the block diagram of FIG. 2 has two optical channels, a detection channel and a localization channel to detect laser pulses 15. The detection channel is essentially a conventional high sensitivity detection sensor comprising an aperture 20, before a narrow-band filter 22 through which light from the aperture 20 is directed onto a photodetector 24. The photodetector 24 produces a pulsed electrical signal when a pulsed laser beam is directed onto photodetector 24, that pulse signal being amplified and applied to a pulse analyzer circuit 26. The aperture 20 in this embodiment determines the FOV for this detection channel. That FOV could, however, be determined by a lens that directs an image of the FOV onto the photodetector.

The localization channel is composed of a narrow-band filter 32 followed by a lens 30, one chosen to match the FOV of the detection channel. The lens 30 focuses light received from the FOV onto a photodetector 34 through a N×M element liquid crystal display matrix 36. The narrow-band filter 32 is one having the same narrow-band width as filter 22 in the detection channel.

The LCD matrix 36 is located at the image plane of the lens 30 in such a manner that a VLPL beam source located in the far field of lens 30 is imaged as a spot on the LCD matrix 36. Each N×M elements in the LCD matrix 36 can be turned ON or OFF by appropriate controls received from a LCD pattern selector 28 connected to the matrix. Electrical pulsed signals from detector 34 created by a VLPL beam being transmitted onto detector 34 are applied to an input of the pulse analyzer circuit 26 which provides an output control signal to the LCD pattern selector 28 when pulsed signals are detected and analyzed.

When a particular element in the LCD matrix 36 is in the OFF state, that LCD element blocks lights focussed by the lens 30 onto that particular area from reaching photodetector 34. When a particular LCD element is in the ON state, light is transmitted through that element onto the photodetector 34. The LCD matrix 36, under control of the LCD pattern selector 28, can define a variable direction of regard (DOR) and a variable FOV depending on which LCD elements are ON or OFF. The FOV is defined by the size of a clear window on the LCD matrix formed by LCD elements (one or more) being in an ON state while the DOR is defined by the position of that window on the LCD matrix. The detection channel and localization channel are mechanically arranged to look at the same location and have the same FOV when the LCD matrix 36 is completed cleared (all LCD elements being in the ON state).

The currents (pulse signals) generated by photodetector 24 and 34 are applied to the pulse analyzer circuit 26 which processes that signal information and sends control signals to the LCD pattern selector 28 to control elements in the LCD matrix 36 and to update the matrix in accordance with a search algorithm. Bach time a laser signal is detected by the detection channel, the output of the localization channel is checked by the pulse analyzer circuit for simultaneous detection from the two channels. If detection of a signal is made on both channels, then the FOV of the localization channel is narrowed down by creating a smaller clear window to improve positioning accuracy at the next iteration. Bach time a detection occurs, the DOR and the FOV are updated until precisely aligned with the source. The algorithm is repeated until a single element of the LCD matrix 36 is left open and the position of that single element in the matrix provides the coordinates (x, y) of the VLPL source. If no simultaneous detection is made on both channels, then the FOV in the localization channel is widened until a further simultaneous detection occurs. The DOR can then be modified to reflect the next best estimate of source locations.

Any pattern sequence can be used for the search pattern algorithm but preferably a sequence is selected that will minimize search time. One example of such a sequence for a 2×2 element LCD is illustrated in FIG. 3.

This LISIAR detector is very insensitive to false alarms as it auto-corrects itself during the iterative localization of a VLPL source. This system can also be used to track VLPL sources once one is detected by appropriate control of the LCD matrix. The LCD matrix can also be controlled to compensate for the displacement of a moving detection platform when required.

Various modification may be made to the preferred embodiments without departing from the spirit and scope of the invention as defined in the appended claims. Although the described LISIAR has been described for the detection of VLPL pulsed laser sources, the same principle applies for the detection and the localization of either pulsed or CW modulated laser sources.

The embodiments of the invention in which an exclusive property or privilege is claimed are defined as follows:

1. A laser warning receiver comprising an aperture in a detection channel with a fixed field-of-view (FOV) and a first optical filter before a detector whereby any laser beam originating from a source in that FOV will extend through the aperture and filter and onto the detector which will provide a signal in response to the detection of a laser beam, that signal being applied to one input of a pulse analyzer circuit, the receiver further comprising a localization channel with a second filter similar to the first filter and a lens selected to have a similar FOV as the one in the detection channel, both channels being arranged to be directed to the same FOV, the lens focussing the FOV onto a second detector through an N×M liquid crystal display (LCD) matrix, a laser beam originating from a source in that FOV will, provided the N×M elements in the matrix are transparent, produce an output from the second detector which is applied as an input to the pulse analyzer circuit to which the second detector is connected, an output from the pulse analyzer circuit being connected to a LCD pattern selector which is connected to the LCD matrix and provide control signals to the matrix that determines which elements are transparent and which ones will block light received from reaching the second detector, said selector providing a transparent window in said matrix, the size of the window and its position being variable with any laser beam detected by the second detector passing through the window, the location and size of the window being iterative varied and made smaller by the pattern selector, when a laser beam is detected, the position of the resulting smaller window on the matrix determining the co-ordinates of the originating source of a detected laser beam.

2. A laser warning receiver as defined in claim 1, wherein the optical filters have a fixed narrow spectral bandwidth.

3. A laser warning receiver comprising a detection channel with a fixed field-of-view (FOV) determined by a lens in the detection channel, a first optical filter in the detection channel being located before a detector whereby any laser beam originating from a source in that FOV will extend through the filter and be focussed onto the detector which will provide a signal in response to the detection of a laser beam, that signal being applied to one input of a pulse analyzer circuit, the receiver further comprising a localization channel with a second filter similar to the first filter and a second lens selected to have a similar FOV as the FOV in the detection channel, both channels being arranged to be directed to the same FOV, the lens focussing the FOV onto a second detector through an N×M liquid crystal display (LCD) matrix, a laser beam originating from a source in that FOV will, provided the N×M elements in the matrix are transparent, produce an output from the second detector which is applied as an input to the pulse analyzer circuit to which the second detector is connected, an output from the pulse analyzer circuit being connected to a LCD pattern selector which is connected to the LCD matrix and provide control signals to the matrix that determines which elements are transparent and which ones will block light received from reaching the second detector, said selector providing a transparent window in said matrix, the size of the window and its position being variable with any laser beam detected by the second detector passing through the window, the location and size of the window being iterative varied and made smaller by the pattern selector, when a laser beam is detected, the position of the resulting smaller window on the matrix determining the co-ordinates of the originating source of a detected laser beam.

4. A laser warning receiver as defined in claim 3, wherein the optical filters have a fixed narrow spectral bandwidth.

5. A laser warning receiver as defined in claim 1, wherein the fixed field-of-view in the detection channel is determined by an aperture located before the detector.

* * * * *

UNITED STATES PATENT AND TRADEMARK OFFICE
CERTIFICATE OF CORRECTION

PATENT NO. : 7,414,568 B2 Page 1 of 1
APPLICATION NO. : 10/395083
DATED : August 19, 2008
INVENTOR(S) : Fortin et al.

It is certified that error appears in the above-identified patent and that said Letters Patent is hereby corrected as shown below:

On the cover page under (73) Assignee:
Change "Her Majesty the Queen in right of Canada, as represented by the Minister of National Defence of Her Majesty's Canadian Government" to
--Her Majesty the Queen as represented by the Minister of National Defence of Her Majesty's Canadian Government--.

In column 2, line 21, please change "he" to --the--.

In column 3, line 9, please change "pulses are" to --pulses D are--.

In column 4, line 49, please change "mrad possible" to --mrad is possible--.

In column 5, lines 53 and 59, please change "Bach time" to --Each time--.

Signed and Sealed this

Twenty-fifth Day of November, 2008

JON W. DUDAS
*Director of the United States Patent and Trademark Office*